United States Patent [19]

Vollrath et al.

[11] 3,821,256

[45] June 28, 1974

[54] 2,3-DIHYDROBENZOFURANYLMETHYL CHRYSANTHEMIC ESTERS

[75] Inventors: Robert Vollrath, Bad Duerkheim; Walter Boell, Mutterstadt; Guenther Scheuerer, Ludwigshafen; Heinrich Adolphi, Limburgerhof, all of Germany

[73] Assignee: Badische Anilin- & Soda-Fabrik Aktiengesellschaft, Ludwigshafen/Rhein, Germany

[22] Filed: Feb. 17, 1972

[21] Appl. No.: 227,281

[30] Foreign Application Priority Data
Feb. 25, 1971  Germany............................ 2108932

[52] U.S. Cl.......................... 260/346.2 R, 424/285
[51] Int. Cl.............................................. C07d 5/36
[58] Field of Search............................ 260/346.2 R

[56] References Cited
UNITED STATES PATENTS

| | | | |
|---|---|---|---|
| 3,567,740 | 3/1971 | Matsui et al. | 260/347.4 |
| 3,716,560 | 2/1973 | Taya et al. | 260/346.2 |

OTHER PUBLICATIONS

Murayama et al., Chem. Abstracts (1971), Vol. 74, 63489; Abstract of Ger. Offen. 2028275 Jan. 7, 1971.
Matsui et al., Agr. Biol. Chem., (1967) Vol. 31, No. 10, p. 1143–1150.

*Primary Examiner*—Henry R. Jiles
*Assistant Examiner*—Bernard Dentz
*Attorney, Agent, or Firm*—Johnston, Keil, Thompson & Shurtleff

[57] ABSTRACT

New and valuable chrysanthemic esters containing as alcohol component a 2,3-dihydrobenzofuryl methyl alcohol and a process for controlling pests with these compounds.

4 Claims, No Drawings

2,3-DIHYDROBENZOFURANYLMETHYL CHRYSANTHEMIC ESTERS

The present invention relates to new and valuable chrysanthemic esters, i.e., those of 2,3-dihydrobenzofuryl methyl alcohols, pesticides containing these compounds and their use in pest control.

It is known to use chrysanthemic esters as pesticides; however, their action is not completely satisfactory.

We have now found that chrysanthemic esters of the formula

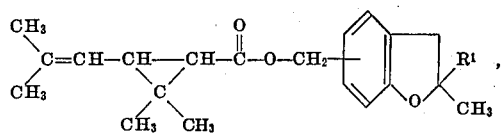

wherein $R^1$ denotes hydrogen or alkyl of 1 to 3 carbon atoms (methyl, ethyl, propyl), are eminently suitable for controlling pests and have an excellent insecticidal action on flies and their larvae, mosquitoes, aphids, caterpillars and bugs. They may therefore be used for combatting injurious and troublesome insects in the home, in human and veterinary hygiene, and in the plant protection field. The active ingredients are applied by treating, e.g. by spraying, dusting or otherwise contacting, the insects with them.

The compounds according to the invention may be prepared for instance by reaction of a substituted phenol with an allyl halide to give phenyl allyl ether in accordance with the following equation:

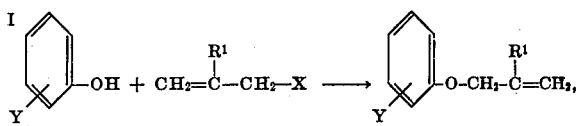

where $R^1$ has the above meanings, X denotes halogen (chlorine, bromine), and Y denotes the $CH_2OH$ radical or a functional group which is easily convertible into the $CH_2OH$ radical, e.g., the formyl, carbalkoxy or acyloxymethyl group or the chrysanthemumoyloxymethyl radical; by heating the phenyl allyl ether to a temperature above 200° C, Claisen rearrangement and ring closure to give the 2,3-dihydrobenzofuran derivative taking place, in accordance with the following equation:

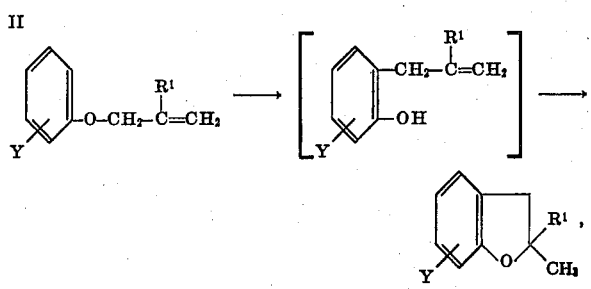

$R^1$ and Y having the above meanings; and, when Y does not denote the chrysanthemumoyloxymethyl radical, reaction of the 2,3-dihydrobenzo-furylmethyl derivative obtained in an additional reaction step (reduction, hydrolysis with chrysanthemic acid derivatives in accordance with the following equation:

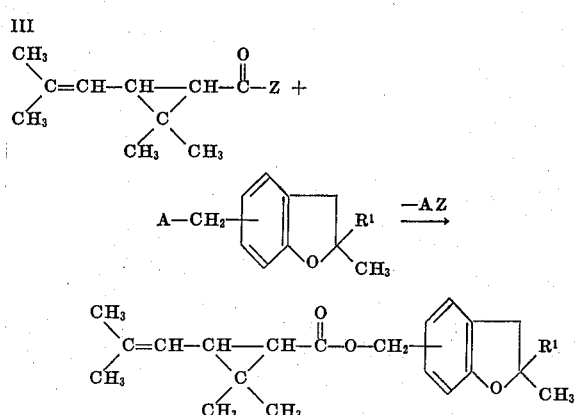

A denoting a hydroxyl or acyloxy group or halogen, e.g., chlorine or bromine, and Z denoting chlorine, a hydroxy, alkoxy or acyloxy group, e.g., the chrysanthemumoyloxy group. The chrysanthemic acid derivatives in equation III may also be the alkali metal or ammonium salts of chrysanthemic acid.

The phenyl allyl ethers may be prepared by conventional methods by reacting phenols with allyl halides in alcohols, acetone, water or a mixture thereof as solvent, in the presence of an inorganic or organic base, e.g. sodium hydroxide, sodium alcoholate and potassium carbonate, at temperatures of from 50° to 150° C, preferably 50° to 90° C.

The next reaction step — Claisen rearrangement and ring closure — is carried out by heating the phenyl allyl ether at temperatures of from 150° to 300° C, preferably 230° to 250° C. The reaction may be carried out with or without solvents. Particularly suitable solvents are high-boiling phenols, e.g., 2,6-xylenol. The reaction is favorably influenced by acid catalysts, e.g., anhydrous magnesium chloride. Reaction times are, depending on substitutents, reaction temperature, solvent and catalyst, from 1 to 12 hours.

The chrysanthemic esters (equation III) are best prepared by reacting the appropriately substituted 2,3-dihydrobenzylfuryl methyl alcohols with chrysanthemic acid chloride in an inert organic solvent, e.g., benzene, toluene, ether, ligroin, tetrahydrafuran and chloroform, in the presence of an inorganic or organic base, e.g., sodium hydroxide, triethylamine and pyridine, at temperatures of from 0° to 60° C. Reaction times are, depending on the substituents and the temperature, from 1 to 8 hours.

The chrysanthemic esters may also be prepared by a transesterification reaction, e.g., by heating chrysanthemic acid ethyl ester and 2,3-dihydrobenzofuryl methyl alcohol with or without solvents at from 80° to 150° C and distilling off the ethanol liberated during the reaction. Suitable solvents are benzene, toluene, xylene, and chlorinated hydrocarbons, e.g., carbon tetrachloride. The reaction is favorably influenced by acid or basic catalysts, e.g., p-toluene-sulfonic acid and sodium methylate. Reaction times are 1 to 6 hours.

The chrysanthemic esters may also be prepared by reacting chloro (bromo)-methyl-2,3-dihydrobenzofurans with the alkali metal or ammonium salts of chrysanthemic acid with or without solvents at temperatures of from 80° to 200° C. Reaction times are 2 to 6 hours.

The following examples illustrate the preparation of the compounds of the invention.

EXAMPLE 1

2-methallyloxybenzaldehyde

At room temperature and while stirring, 103 parts by weight of methallyl chloride is added to a mixture of 122 parts of salicylaldehyde, 160 parts of potassium carbonate and 400 parts of ethanol; the mixture is then heated for 12 hours under reflux. The ethanol is distilled off, water is added to the residue, and the mixture is extracted with benzene. The benzene phase is washed with a 10 percent by weight caustic solution and subsequently with water until neutral, dried and concentrated in vacuo. The crude product is fractionally distilled in vacuo.

Boiling point (0.2 mm Hg): 84° to 86° C; yield: 143 parts.

The product may be further purified via the corresponding sodium bisulfite adduct.

7-formyl-2,2-dimethyl-2,3-dihydrobenzofuran 97 parts of 2-methallyloxybenzaldehyde is heated at 250°C for 3 hours in a nitrogen atmosphere, and subsequently slowly distilled. The distillate (81 parts) is diluted with benzene and extracted six times with a 12 percent caustic solution; the benzene phase is washed with water until neutral and the benzene is distilled off in vacuo. The solid residue is recrystallized from a small amount of ligroin.

Melting point: 79° to 83° C.

7-hydroxymethyl-2,2-dimethyl-2,3-dihydrobenzofuran

At 5° to 10° C, 14.5 parts of 7-formyl-2,2-dimethyl-2,3-dihydrobenzofuran dissolved in 100 parts of dry ether is slowly added to 1.6 parts of lithium aluminium hydride in 20 parts of dry ether, and the whole is stirred at room temperature for 1 hour. The mixture is subsequently decomposed, with ice cooling, with water and suction filtered, and the ethereal phase formed is washed until neutral with a saturated common salt solution. The residue remaining after drying and distillation of the ether is recrystallized from ligroin.

Melting point: 66° to 68°C.
Analysis: $C_{11}H_{14}O_2$ (178.2)
|      | C    | H   |
|------|------|-----|
| calc.: | 74.2 | 7.9 |
| found: | 74.5 | 8.1 | cis/trans-chrysanthemic acid-2,2-dimethyl-2,3-dihydrobenzofuryl-7-methyl ester (I)

At 5° to 10° C, a solution of 14.7 parts of cis/trans-chrysanthemic acid chloride (cis/trans ratio 30:70) in 20 parts of chloroform is slowly added to a solution of 14 parts of 7-hydroxymethyl-2,2-dimethyl-2,3-dihydrobenzofuran in 100 parts of chloroform and 12.5 parts of pyridine. After stirring the reaction mixture for 2 hours at 25° C, it is poured into 200 parts of water and the chloroform phase is separated and washed with dilute sulfuric acid, sodium hydrogen carbonate solution and water. The residue remaining after evaporation of the chloroform is chromatographed in ligroin using aluminium oxide. There is obtained 22 parts of cis/trans-chrysanthemic acid-2,2-dimethyl-2,3-dihydrobenzofuryl-7-methyl ester (I) as a colorless oil; $n_D^{25}$: 1.5158.

For proton resonance spectrum, see Table 1.

EXAMPLE 2

4-methallyloxybenzaldehyde

The method of preparation of 2-methallyloxybenzaldehyde described in Example 1 is adopted, the starting material being p-hydroxy-benzaldehyde.

Boiling point (0.05 mm Hg): 88° to 92° C.

5-formyl-2,2-dimethyl-2,3-dihydrobenzofuran

Equal amounts of 4-methallyloxybenzaldehyde and 2,6-dimethylphenol are heated for 10 hours at 200° C. The 2,6-dimethylphenol is subsequently distilled off (b.p. (9 mm Hg): 80° to 85° C). The residue is taken up in benzene and extracted four times with 12 percent caustic solution. The benzene phase is washed with water and fractionally distilled.

Boiling point (0.2 mm Hg): 95° to 98° C.

5-hydroxymethyl-2,2-dimethyl-2,3-dihydrobenzofuran

The method of preparation is that described in Example 1 for 7-hydroxymethyl-2,2-dimethyl-2,3-dihydrobenzofuran, by reduction of 5-formyl-2,2-dimethyl-2,3-dihydrobenzofuran with lithium aluminium hydride.

Boiling point (0.2 mm Hg): 105° to 107°C.
Analysis: $C_{11}H_{14}O_2$ (178.2)
|      | C    | H   |
|------|------|-----|
| calc.: | 74.2 | 7.9 |
| found: | 74.0 | 7.7 | cis/trans-chrysanthemic acid-2,2-dimethyl-2,3-dihydrobenzofuryl-5-methyl ester (II)

Starting from 8.8 parts of 5-hydroxymethyl-2,2-dimethyl-2,3-dihydrobenzofuran there is obtained, analogously to the esterification reaction described in Example 1, 15 parts of cis/trans-chrysanthemic acid-2,2-dimethyl-2,3-dihydrobenzofuryl-5-methyl ester (II) as a colorless oil; $n_D^{25}$: 1.5189.

Analysis: $C_{21}H_{28}O_3$ (328.4)
|      | C    | H   |
|------|------|-----|
| calc.: | 76.8 | 8.5 |
| found: | 76.9 | 8.7 |

For proton resonance spectrum, see Table 1.

EXAMPLE 3

3-methallyloxybenzaldehyde

The method of preparation of 2-methallyloxybenzaldehyde described in Example 1 is adopted, the starting material being m-hydroxy-benzaldehyde.

Boiling point (0.2 mm Hg): 84° to 88° C.

3-methallyloxybenzyl alcohol

At 15° to 20° C, 88 parts of 3-methallyloxybenzaldehyde dissolved in 70 parts of dry ether is dripped into a solution of 7.6 parts of lithium aliminium hydride in 300 parts of dry ether. After stirring for 15 minutes the excess lithium aluminium hydride is decomposed with ethyl acetate and hydrolyzed with 7 percent hydrochloric acid. The ether phase is washed until neutral with a saturated common salt solution and dried. After evaporation of the ether there remains 85 parts of 3-methallyloxybenzyl alcohol.

Boiling point (0.2 mm Hg): 103° to 105° C.

3-methallyloxybenzyl acetate 19 parts of acetic anhydride is added to a solution of 30 parts of 3-methallyloxybenzyl alcohol in 100 parts of chloroform. The reaction, which is initiated by adding a few drops of concentrated sulfuric acid, is kept at 35° C by cooling. A small amount of sodium acetate is added to neutralize the sulfuric acid, the mixture is suction filtered and the chloroform solution distilled.

Boiling point (0.25 mm Hg): 102° to 104° C; $n_D^{25}$: 1.5105.

4- and 6-acetoxymethyl-2,2-dimethyl-2,3-dihydrobenzofuran 33 parts of 3-methallyloxybenzyl acetate is heated in a sealed tube for 5 hours at 200° C. Infrared and proton resonance spectra reveal the presence of a mixture of 3- and 5-acetoxymethyl-2-methallylphenol. 1 part of anhydrous magnesium chloride is added and the mixture heated for 3 hours at 160° C. The mixture is taken up in benzene and the solution is separated from the magnesium chloride by decanting and extracted four times with a 12 percent caustic solution. The benzene phase is washed with water until neutral and distilled. There is obtained a mixture of 4- and 6-acetoxymethyl-2,2-dimethyl-2,3-dihydrobenzofuran (ratio approx. 70:30, which can be altered by varying the reaction conditions).

Boiling point (0.2 mm Hg): 92° to 95° C; $n_D^{25}$: 1.513.

The isomer mixture may be separated by meticulous fractional distillation:

4-acetoxymethyl-2,2-dimethyl-2,3-dihydrobenzofuran,
boiling point (0.1 mm Hg): 83° to 84° C; $n_D^{25}$: 1.5120.

6-acetoxymethyl-2,2-dimethyl-2,3-dihydrobenzofuran,
boiling point (0.1 mm Hg): 87° to 89° C; $n_D^{25}$: 1.5145.

4- and 6-hydroxymethyl-2,2-dimethyl-2,3-dihydrobenzofuran

At 20° to 25° C, a solution of 3 parts of sodium hydroxide in 60 parts of methanol and 10 parts of water is slowly added to a solution of 11 parts of a mixture of 4- and 6-acetoxymethyl-2,2-dimethyl-2,3-dihydrobenzofuran (ratio approx. 55:45) in 40 parts of methanol. After 30 minutes the excess caustic solution is neutralized by adding 1.5 parts of glacial acetic acid. The solution is concentrated in vacuo, the residue is taken up in 100 parts of benzene, and the benzene solution is washed twice, each time with 50 parts of a saturated common salt solution. After removal of the solvent there is obtained a mixture of 4- and 6-hydroxymethyl- 2,2-dimethyl-2,3-dihydrobenzofuran (ratio approx. 55:45).

Boiling point (0.2 mm Hg): 103° to 107° C.

cis/trans-chrysanthemic acid-2,2-dimethyl-2,3-dihydrobenzofuryl-4-methyl ester and -6-methyl ester In an analogous manner to the esterification reaction described in Example 1, there is obtained 14.5 parts of a mixture of cis/trans-chrysanthemic acid-2,2-dimethyl-2,3-dihydrobenzofuryl-4-methyl ester and -6-methyl ester (III) (ratio approx. 55:45) from 8.8 parts of a mixture of 4- and 6-hydroxymethyl- 2,2-dimethyl-2,3-dihydrobenzofuran (ratio approx. 55:45). The proton resonance spectrum of the mixture overlaps the spectra of the components given in Table 1.

Analysis: $C_{21}H_{28}O_3$ (328.4); colorless oil, $n_D^{25}$: 1.5175.

|  | C | H |
|---|---|---|
| calc.: | 76.8 | 8.5 |
| found: | 77.0 | 8.8 |

EXAMPLE 4

4-hydroxymethyl-2,2-dimethyl-2,3-dihydrobenzofuran

The substance is prepared by hydrolysis of 4-acetoxymethyl-2,2-dimethyl-2,3-dihydrobenzofuran in the same manner as described in Example 3.

cis/trans-chrysanthemic acid-2,2-dimethyl-2,3-dihydrobenzofuryl-4-methyl ester (IV)

The product is prepared in the same manner as in Example 1, starting from 4-hydroxymethyl-2,2-dimethyl-2,3-dihydrobenzofuran; colorless oil, $n_D^{25}$: 1.5171

For proton resonance spectrum, see Table 1.

EXAMPLE 5

6-hydroxymethyl-2,2-dimethyl-2,3-dihydrobenzofuran

The compound is prepared by hydrolysis of 6-acetoxymethyl-2,2-dimethyl-2,3-dihydrobenzofuran in the same manner as described in Example 3.

cis/trans-chrysanthemic acid-2,2-dimethyl-2,3-dihydrobenzofuryl-6-methyl ester (V)

The product is prepared in the same manner as in Example 1, starting from 6-hydroxymethyl-2,2-dimethyl-2,3-dihydrobenzofuran; colorless oil, $n_D^{25}$: 1.5177.

For proton resonance spectrum, see Table 1.

EXAMPLE 6 trans-chrysanthemic acid-2,2-dimethyl-2,3-dihydrobenzofuryl-6-methyl ester (VI)

The product is prepared in the same manner as in Example 1, starting from 6-hydroxymethyl-2,2-dimethyl-2,3-dihydrobenzofuran and trans-chrysanthemic acid chloride; colorless oil, $n_D^{25}$: 1.5174.

For proton resonance spectrum, see Table 1.

TABLE 1.—PROTON RESONANCE SPECTRA OF CHRYSANTHEMIC ACID ESTERS (220 megacycles; CCl₄; internal standard: TMS)

(a) of the chrysanthemumoyl radical (identical, within an error limit of <0.02 p.p.m., for the esters investigated)

|  | >C(CH$_3$)$_2$ |  | =C(CH$_3$)$_2$ |  | =CH— |
|---|---|---|---|---|---|
| Cis ester | $\delta$=1.20 (s); | $\delta$=1.25 (s) | $\delta$=1.67 (s); | $\delta$=1.75 (s) | $\delta$=5.38 (d) |
| Trans ester | $\delta$=1.14 (s); | $\delta$=1.24 | $\delta$=1.71 (s) |  | $\delta$=4.90 (d) |

(b) of the 2,2-dimethyl-2,3-dihydrobenzofuryl-$x$-methyl radical

|  | O—C(CH$_3$)$_2$ | —CH$_2$— | —O—CH$_2$— | Aromatic |
|---|---|---|---|---|
| $x$=4 (IV) | $\delta$=1.45 (s) | $\delta$=3.00 (s) | $\delta$=4.97 (s) cis<br>$\delta$=5.00 (s) trans | $\delta$=6.63 (d); 6,78 (d); 7.07 (t).<br>J=8 cycles. |
| $x$=5 (II) | $\delta$=1.41 (s) | $\delta$=2.97 (s) | $\delta$=4.95 (s) cis<br>$\delta$=4.98 (s) trans | $\delta$=6.64 (d); 7.09 (d); 7.12 (s).<br>J≈7.5 cycles. |
| $x$=6 (V) | $\delta$=1.44 (s) | $\delta$=2.95 (s) | $\delta$=4.97 (s) cis<br>$\delta$=5.00 (s) trans | $\delta$=6.68 (s); 6.78 (d); 7.05 (d).<br>J=8 cycles. |
| $x$=7 (I) | $\delta$=1.42 (s) | $\delta$=2.92 (s) | $\delta$=4.94 (s) cis<br>$\delta$=4.97 (s) trans | $\delta$=6.67 (t); 6.95 (d); 7.20 (d).<br>J=8 cycles. |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C, e.g. tetrahydronaphthalene or alkylated naphthalenes, or organic liquids having boiling points higher than 150° C and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

EXAMPLE 7

80 parts by weight of compound I is mixed with 20 parts by weight of N-methyl-α-pyrrolidone. A mixture is obtained which is suitable for application in the form of very fine drops.

EXAMPLE 8

20 parts by weight of compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

20 parts by weight of compound I is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 10

20 parts by weight of compound I is dissolved in a mixture consisting of 25 parts by weight of cyclohexanol, 65 parts by weight of a mineral oil fraction having a boiling point between 210° and 280° C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 11

20 parts by weight of compound I is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 12

3 parts by weight of compound I is intimately mixed with 97 parts by weight of particulate kaolin. A dust is obtained containing 3 percent by weight of the active ingredient.

EXAMPLE 13

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

The following examples demonstrate the biological action of the new compounds. Prior art compound A

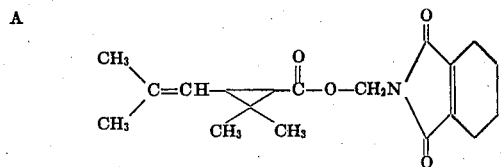

was compared with active ingredient B

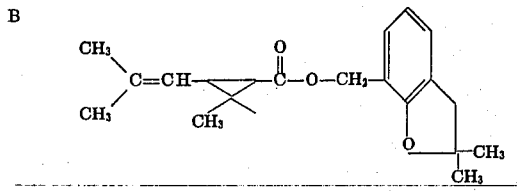

(compound I according to the invention) and C and D

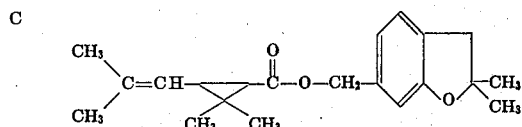

(compounds V and VI according to the invention).

EXAMPLE 14

Action on Larvae of the Yellow Fever Mosquito (*Aedes Aegypti*)

The active ingredients were added to water in which there were larvae in the third and fourth development stage. The degree of action was determined after 24 hours.

| Active ingredient | Concentration in water (ppm) | Action |
|---|---|---|
| A | 5.0 | ineffective |
| B | 0.2 | 100% mortality |
| B | 0.1 | 80% mortality |
| C | 0.1 | 95% mortality |
| D | 0.1 | 90% mortality |

EXAMPLE 15

Action on cabbage moth caterpillars (Plutella maculipennis)

Leaves of young cabbage plants were dipped in aqueous emulsions of the active ingredients. After brief drying, caterpillars of the cabbage moth were placed on the leaves. The action was determined after 48 hours.

| Active ingredient | Concentration in % | Action |
|---|---|---|
| A | 0.05 | effective |
| A | 0.02 | ineffective |
| B | 0.02 | effective |
| C | 0.02 | effective |
| D | 0.01 | effective |

EXAMPLE 16

Action on bean aphid (Aphis fabae)

Bean plants suffering heavy attack from bean aphids were sprayed to run-off with aqueous emulsions of the active ingredients. The kill rate was determined after 24 hours.

| Active ingredient | Concentration in % | Action |
|---|---|---|
| A | 0.1 | ineffective |
| B | 0.1 | mortality greater than 80% |

We claim:
1. A substituted chrysanthemic ester of the formula

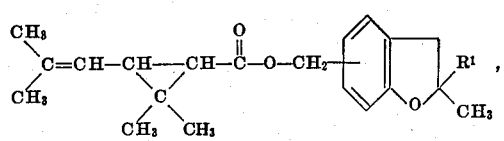

where $R^1$ denotes hydrogen or alkyl of 1 to 3 carbon atoms.

2. A substituted chrysanthemic ester as claimed in claim 1 wherein $R^1$ is methyl.

3. Cis/trans-chrysanthemic acid-2,2-dimethyl-2,3-dihydrobenzofuryl-7-methyl ester.

4. Trans-chrysanthemic acid-2,2-dimethyl-2,3-dihydrobenzofuryl-6-methyl ester.

* * * * *

UNITED STATES PATENT AND TRADEMARK OFFICE
CERTIFICATE OF CORRECTION

PATENT NO. : 3,821,256
DATED : June 28, 1974
INVENTOR(S) : Robert Vollrath et al It is certified that error appears in the above-identified patent and that said Letters Patent are hereby corrected as shown below:

In Column 1, Line 22, delete "wherein" and substitute --where--

In Column 2, Line 47, delete "dihydrobenzylfuryl" and substitute --dihydrobenzofuryl--

In Column 9, delete the second formula and substitute

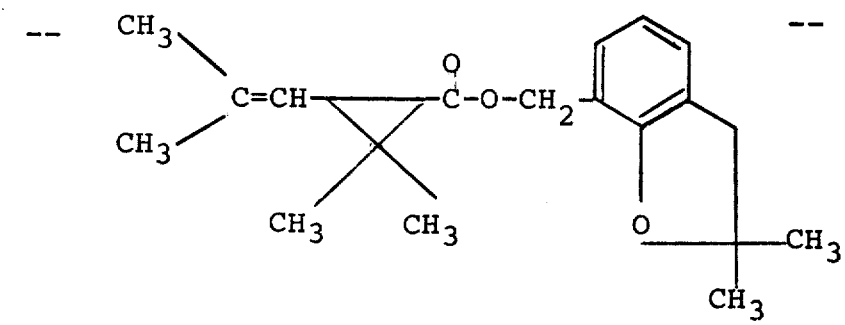

Signed and Sealed this

Twentieth Day of July 1976

[SEAL]

Attest:

RUTH C. MASON
Attesting Officer

C. MARSHALL DANN
Commissioner of Patents and Trademarks